US010364057B2

(12) United States Patent
Tinsley

(10) Patent No.: US 10,364,057 B2
(45) Date of Patent: Jul. 30, 2019

(54) PET WATER CONTAINER AND BOWL

(71) Applicant: Cornell Tinsley, N Las Vegas, NV (US)

(72) Inventor: Cornell Tinsley, N Las Vegas, NV (US)

( * ) Notice: Subject to any disclaimer, the term of this patent is extended or adjusted under 35 U.S.C. 154(b) by 118 days.

(21) Appl. No.: 15/396,299

(22) Filed: Dec. 30, 2016

(65) Prior Publication Data

US 2017/0190458 A1    Jul. 6, 2017

Related U.S. Application Data

(60) Provisional application No. 62/272,688, filed on Dec. 30, 2015.

(51) Int. Cl.
*A01K 7/00* (2006.01)
*B65D 1/02* (2006.01)
*B65D 23/12* (2006.01)

(52) U.S. Cl.
CPC .............. *B65D 1/0261* (2013.01); *A01K 7/00* (2013.01); *B65D 23/12* (2013.01)

(58) Field of Classification Search
CPC ....... A01K 5/0107; A01K 7/00; B65D 1/0261
See application file for complete search history.

(56) References Cited

U.S. PATENT DOCUMENTS

| D360,338 S | * | 7/1995 | Westgerdes | D7/510 |
| 6,405,675 | B1 * | 6/2002 | Mills | A01K 7/00 |
| | | | | 119/51.5 |
| 7,287,487 | B2 | 10/2007 | Hurwitz | |
| 9,505,527 | B1 * | 11/2016 | Campbell | B65D 41/04 |
| 2010/0243658 | A1 * | 9/2010 | Davtyan | A47G 19/2205 |
| | | | | 220/500 |
| 2011/0097453 | A1 | 4/2011 | Buesching | |
| 2011/0283948 | A1 | 11/2011 | Wong | |
| 2017/0327263 | A1 * | 11/2017 | Haar | B65D 1/04 |

FOREIGN PATENT DOCUMENTS

WO    WO-0130685 A1 *  5/2001   ............... A01K 7/00

* cited by examiner

*Primary Examiner* — Kristen C Hayes
(74) *Attorney, Agent, or Firm* — Daniel Boudwin; Global Intellectual Property Agency

(57) ABSTRACT

A container for storing liquid having a bowl removably secured on a lower end thereof. The container defines an interior volume for storing liquid, such as water. The container includes an upper end having a body and an opening, wherein the opening can receive liquid therethrough. A lower end of the container includes threading disposed around an exterior thereof, between a first and second end. A bowl is removably securable to the threading of the lower end of the container so as to allow a user to selectively detach the bowl from the container and fill the bowl with liquid stored within the container. In one embodiment, the lower end of the container includes a smaller width than a width of the body of the upper end so as to allow a sidewall of the bowl to align with a sidewall of the body.

10 Claims, 3 Drawing Sheets

PET WATER CONTAINER AND BOWL

CROSS REFERENCE TO RELATED APPLICATION

This application claims the benefit of U.S. Provisional Application No. 62/272,688 filed on Dec. 30, 2015. The above identified patent application is herein incorporated by reference in its entirety to provide continuity of disclosure.

BACKGROUND OF THE INVENTION

The present invention relates to pet water bowls. More specifically, the present invention provides a liquid storing container that is removably securable at various positions to a bowl via a threaded attachment.

Many pet owners and pet caretakers enjoy taking their dogs for lengthy walks for the health of the pet owner and pet. While doing so, it is important for both the pet owner and pet to stay hydrated while outdoors, particularly during periods of warm weather. Pet owners often bring a bottle filled with water on these walks, but often fail to bring a bowl from which their pet can drink. As a result, the pet owner may simply pour water from the bottle into the pet's mouth or onto the ground, which can be wasteful and unsanitary. Thus, a container having a bowl removably secured to the lower end thereof is desired.

Devices have been disclosed in the known art that relate to bottles with attachable bowls. However, these known art devices have several drawbacks. The devices in the known art fail to provide a threaded connection between both the bowl and the container, thereby allowing for ease of use and adjustability of the height at which the lower end of the container or bottle rests within the bowl. As a result, water from the bowl has to be discarded prior to securing the bowl the bottle or container.

In light of the devices disclosed in the known art, it is submitted that the present invention substantially diverges in design elements from the prior art and consequently it is clear that there is a need in the art for an improvement to existing pet water containers and bowls. In this regard the instant invention substantially fulfills these needs.

SUMMARY OF THE INVENTION

In view of the foregoing disadvantages inherent in the known types of pet water container and bowls now present in the prior art, the present invention provides a new pet water container and bowl wherein the same can be utilized for providing convenience for the user when storing and dispensing liquid for both the user and the user's pet.

It is therefore an object of the present invention to provide a new and improved pet water container and bowl that has all of the advantages of devices in the known art and none of the disadvantages. The container defines an interior volume for storing liquid, such as water. The container includes an upper end having a body and an opening, wherein the opening can receive liquid therethrough. A lower end of the container includes threading disposed around an exterior thereof, between a first and second end. A bowl is removably securable to the threading of the lower end of the container so as to allow a user to selectively detach the bowl from the container and fill the bowl with liquid stored within the container. In one embodiment, the lower end of the container includes a smaller width than a width of the body of the upper end so as to allow a sidewall of the bowl to align with a sidewall of the body.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
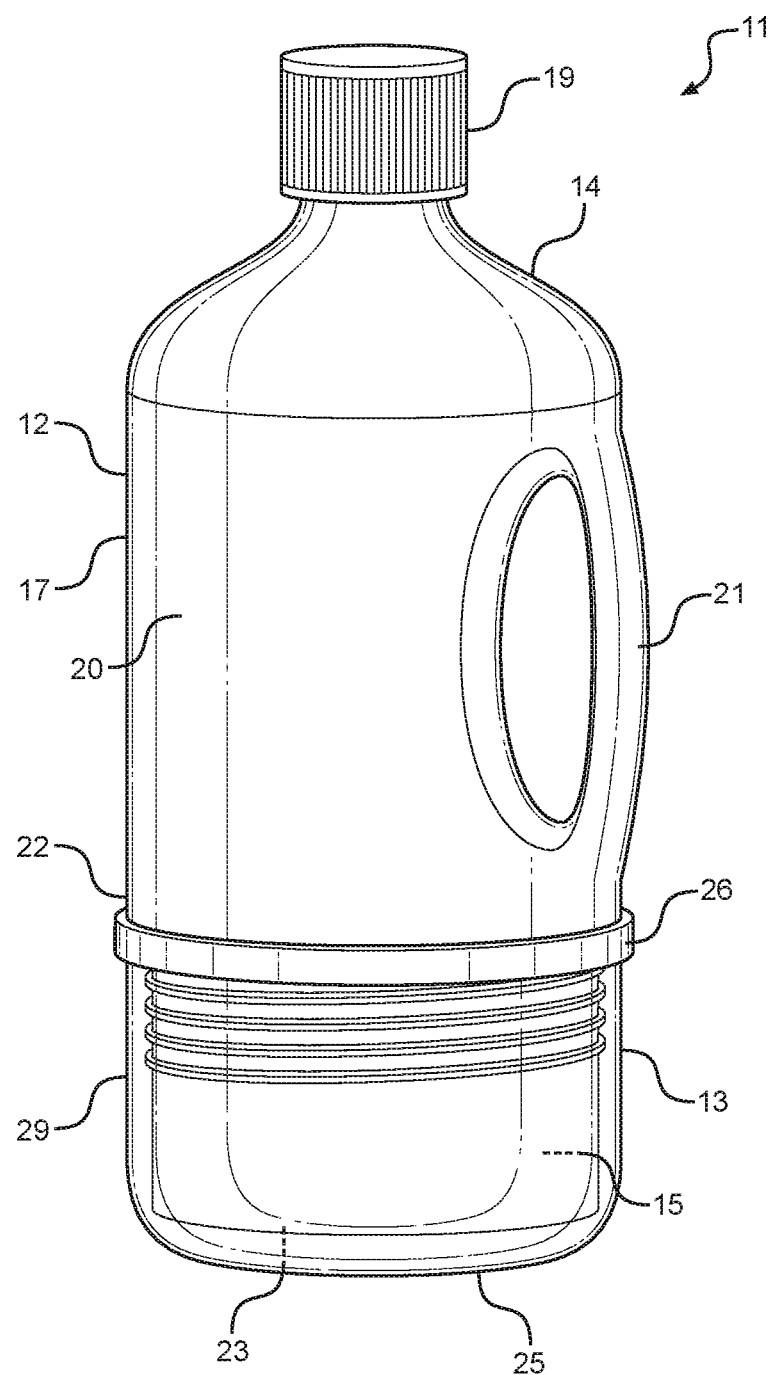
FIG. 1 shows a perspective view of the pet water container and bowl.

Reference is made herein to the attached drawings. Like reference numerals are used throughout the drawings to depict like or similar elements of the pet water container and bowl. For the purposes of presenting a brief and clear description of the present invention, the preferred embodiment will be discussed as used for storing and dispensing liquid for both the user and the user's pet. The figures are intended for representative purposes only and should not be considered to be limiting in any respect.

Figure 2:
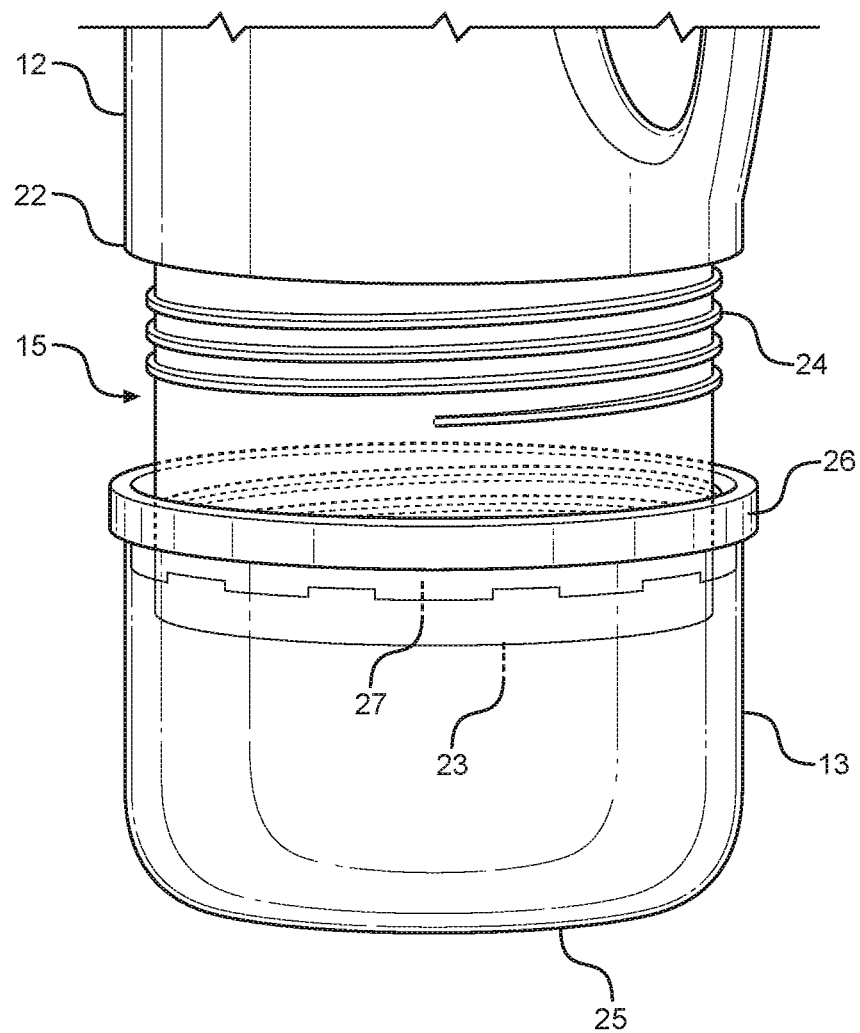
FIG. 2 shows a close-up view of the bowl and a lower end of the container of the pet water container and bowl.

Referring now to FIGS. 1 and 2, there are shown perspective views of the pet water container and bowl and a close-up view of the bowl and a lower end of the container of the pet water container and bowl, respectively. The pet water container and bowl 11 comprises both a container 12 and bowl 13, both of which are adapted to store liquid therein. The container 12 defines an interior volume for storing the liquid and comprises an upper end 14 and a closed lower end 15. The upper end 14 comprises an opening 16 and a body 17, wherein the opening 16 is adapted to receive liquid therethrough. In the illustrated embodiment, the opening 16 is disposed at the top 18 (See FIG. 3) of the container 12 and comprises threading around an exterior surface thereof. A cap 19 having a threaded interior surface is removably securable to the opening 16 so as to prevent liquid from flowing through the opening 16 when desired.

The body 17 of the container 12 comprises one or more sidewalls 20. In the illustrated embodiment, the body 17 comprises a single sidewall 20 forming a circular shaped cross section. A handle 21 extends from the body 17 forming a void between the sidewall 20 of the body 17 and the handle 21, wherein the void is adapted to receive a user's hand therethrough. In alternate embodiments, a handle is absent and the body 17 comprises indentations along the sidewall 20 forming an imprint of fingers from a hand in order to assist a user in gripping the container 12. The container 12 is composed of any suitable material such as transparent hard plastic or glass.

In the illustrated embodiment, an interior of the lower end 15 of the container 12 is in fluid communication with the upper end 14 and is therefore adapted to store liquid therein. In an alternate embodiment, the interior of the lower end 15 is not in fluid communication with the upper end 14 of the container 12 and is composed of a solid material. In this way, the lower end 15 can serve as a weight, supporting the container 12 in an upright configuration and preventing the container 12 from tipping over when placed on a ground surface.

The lower end 15 of the container 12 includes a first end 22 and a second end 23. Threading 24 is disposed around an exterior of the lower end 15 of the container 12, between the first and second ends 22, 23. The bowl 13 is removably securable to the lower end 15 of the container 12 via engagement with the threading 24. In a first embodiment, the threading 24 partially extends along the length of the lower end 15, whereas the length of the lower end 15 is measured between the first end 22 to the second end 23. When the bowl 13 is attached to the lower end 15 in the first embodiment, the second end 23 of the container rests flush against a base 25 of the bowl 13, and the first end 22 is level with an open upper end 28 (See FIG. 3) of the bowl 13. In a second embodiment, the threading 24 extends fully along the length of the lower end 15 (See in FIG. 3). In this way, the bowl 13 can be secured to the container 12 at various positions or heights along the lower end 15 so as to allow liquid to be contained within the bowl 13 while the container 12 is attached thereto. In this configuration, liquid is contained between the base 25 of the bowl 13 and the lower end 15 of the container 12.

The bowl 13 comprises the open upper end 28, the base 25 and one or more sidewalls 29 extending therefrom. The bowl 13 comprises the same shaped cross section as the lower end 15 of the container 12, which in the illustrated embodiment is a circular cross section. The diameter of the lower end 15 is marginally smaller than the diameter of the bowl 13 in order to allow the bowl 13 to receive the lower end 15 of the container 12 therein. Thus, in the illustrated embodiment, the bowl 13 is configured to completely receive the lower end 15 of the container 12 therein. In the illustrated embodiment, the lower end 15 of the container 12 includes a smaller width than a width of the upper end 14 of the body 17 so as to allow the sidewall 29 of the bowl 13 to align with the sidewall 20 of the body 17 such that an exterior surface of the sidewall of the 20 of the body 17 and an exterior surface of the sidewall 29 of the bowl 13 are coextensive with one another when the lower end 15 of the container 12 is completely received by the bowl 13. Therefore, in the illustrated embodiment, the diameter of the sidewall 29 of the bowl 13 is equivalent to the diameter of the sidewall 30 of the body 17 of the container 12.

A lip 26 extends around the open upper end of the bowl 13 for assisting a user when gripping the pet liquid container and bowl 11. The lip 26 prevents the container 12 from slipping through a user's grasp. The interior surface of the bowl 13, adjacent to the upper end 28, comprises threading 30 thereon for securing to the corresponding threading 24 disposed around the container 12. A plurality of tabs 27 are disposed around the exterior of the bowl 13, adjacent to the upper end 28 thereof. The tabs 27 are configured to add to the strength of the threaded fasteners when in a secured position.

Figure 3:
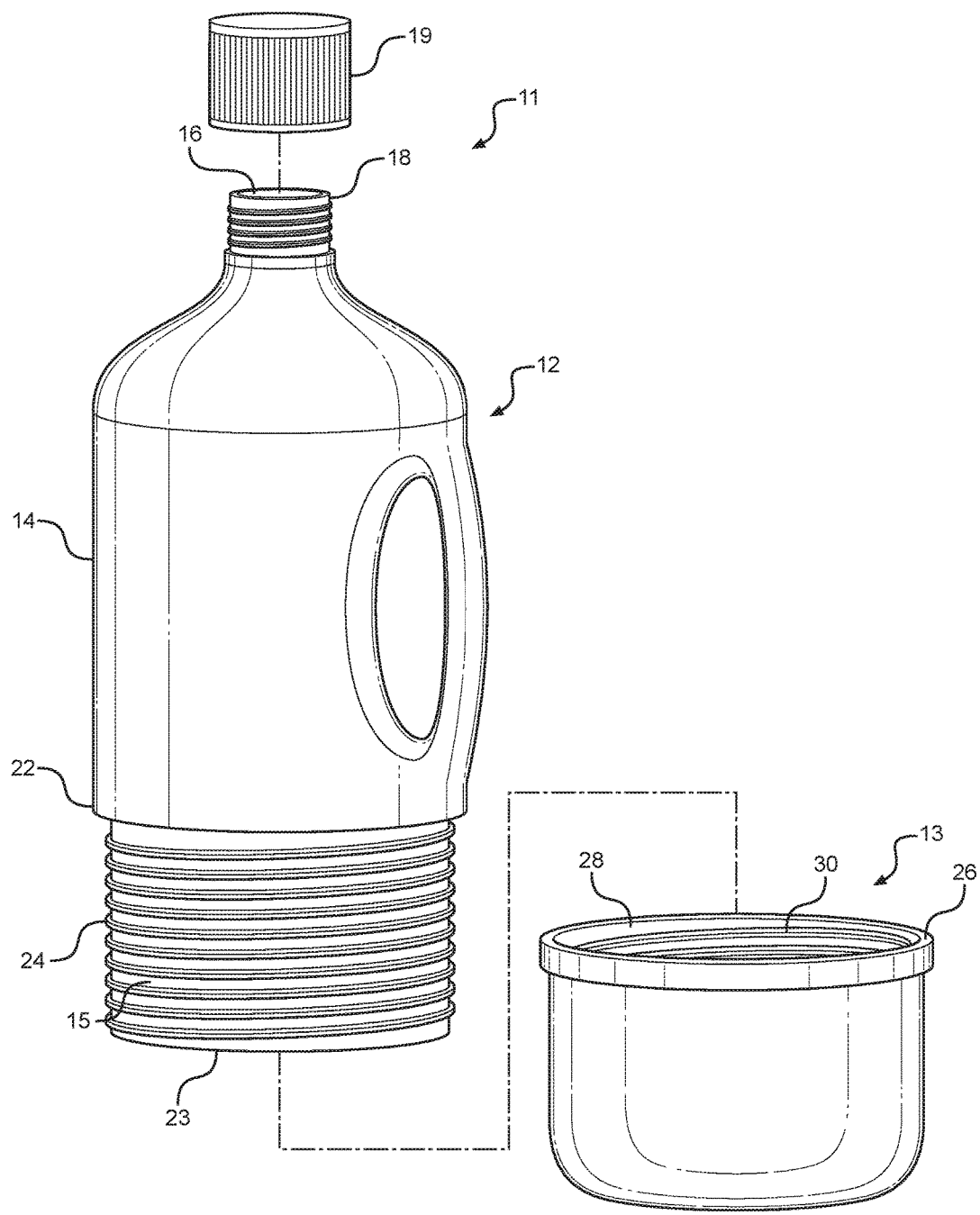
FIG. 3 shows an exploded view of the pet water container and bowl.

Referring now to FIG. 3, there is shown an exploded view of the pet water container and bowl. In operation, a user fills the container 12 with water through the opening 16 thereof. The cap 19 is selectively removed from the opening when removing water from the container 12 such that the user can drink directly from the container 12 or pour water into the bowl 13. The bowl 13 is unscrewed from the container and receives water from the container 12. The bowl 13 is screwed onto the lower end 15 of the container 12 via the threading 23, 24 when the pet is finished. When the open upper end 28 of the bowl 13 is level with the first end 22 of the container 12 the second end 23 of the container 12 rests flush on the base 25 of the bowl 13. When the open upper end 28 of the bowl 13 is secured to the container 12 at a position between the first end 22 and the second end 23 of the lower end 15 of the container 12, a gap exists between the second end 23 and the base 25 of the bowl 13. In this way, liquid can be stored within the bowl 13, thereby preventing a user from discarding liquid when securing the bowl 13 to the container 12.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pet water container and bowl, comprising:
a container defining an interior volume for storing liquid, wherein the container comprises an upper end and a lower end;
wherein the upper end comprises a body and an opening, wherein the opening is adapted to receive liquid therethrough;
the lower end having a first end and a closed second end, wherein threading is disposed around the lower end of the container between the first end and second end;
wherein the lower end comprises a smaller width than a width of the body;
a bowl removably securable to the threading of the lower end of the container;
wherein the bowl comprises a plurality of tabs disposed around an exterior of an upper end thereof.

2. The pet water container and bowl of claim 1, wherein the threading is disposed completely between the first end and second end of the lower end of the container.

3. The pet water container and bowl of claim 1, wherein a sidewall of the bowl aligns with a lower end of the body when the bowl is secured to the container.

4. The pet water container and bowl of claim 1, wherein the lower end of the container is completely disposed within the bowl when the bowl is secured thereto.

5. The pet water container and bowl of claim 1, wherein a gap exists between the second end of the lower end of the container and a lower end of the bowl when the bowl is secured to the container.

6. The pet water container and bowl of claim 1, further comprising a handle disposed on an exterior of the body of the container.

7. The pet water container and bowl of claim 1, further comprising a cap removably securable to the opening of the upper end of the container.

8. The pet water container and bowl of claim 1, wherein the bowl comprises threading on an interior of an upper end thereof for securing to the threading of the lower end of the container.

9. The pet water container and bowl of claim 1, wherein the first end of the lower end of the container is open such that the lower end of the container is in fluid communication with the upper end and adapted to store liquid therein.

10. The pet water container and bowl of claim 1, wherein the first end of the lower end of the container is closed such that the lower end of the container is not in fluid communication with the upper end of the container.

* * * * *